United States Patent [19]

Agar

[11] 4,200,057
[45] Apr. 29, 1980

[54] SHIELD FOR TOPICALLY TREATED ANIMALS

[75] Inventor: Robert F. Agar, Lansdale, Pa.

[73] Assignee: William H. Rorer, Inc., Fort Washington, Pa.

[21] Appl. No.: 918,413

[22] Filed: Jun. 23, 1978

[51] Int. Cl.$^2$ ............................................. A01K 29/00
[52] U.S. Cl. ......................................... 119/1; 119/96
[58] Field of Search ................. 119/96, 106, 1; 132/9; 128/132 R, 133, 134; 40/21 C

[56] References Cited

U.S. PATENT DOCUMENTS

| | | | |
|---|---|---|---|
| 2,241,855 | 5/1941 | Heisterberg | 132/9 |
| 2,998,008 | 8/1961 | Klesa | 119/106 |
| 3,036,554 | 5/1962 | Johnson | 119/96 |
| 3,983,604 | 10/1976 | Phillips | 40/21 C |

Primary Examiner—Jay N. Eskovitz
Attorney, Agent, or Firm—Ernest G. Szoke

[57] ABSTRACT

An improved method for testing the effect of chemical substances on contact with the skin by use of a protective shield to be worn by laboratory test animals in identification purposes and to prevent removal of a topically applied test substance.

7 Claims, 5 Drawing Figures

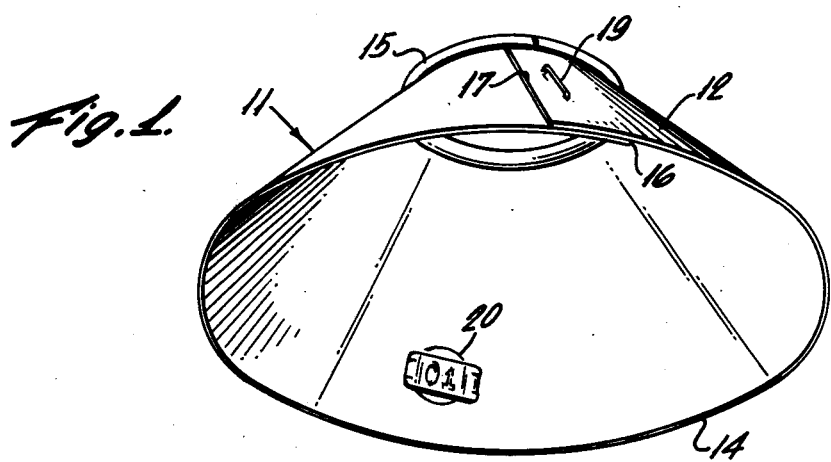
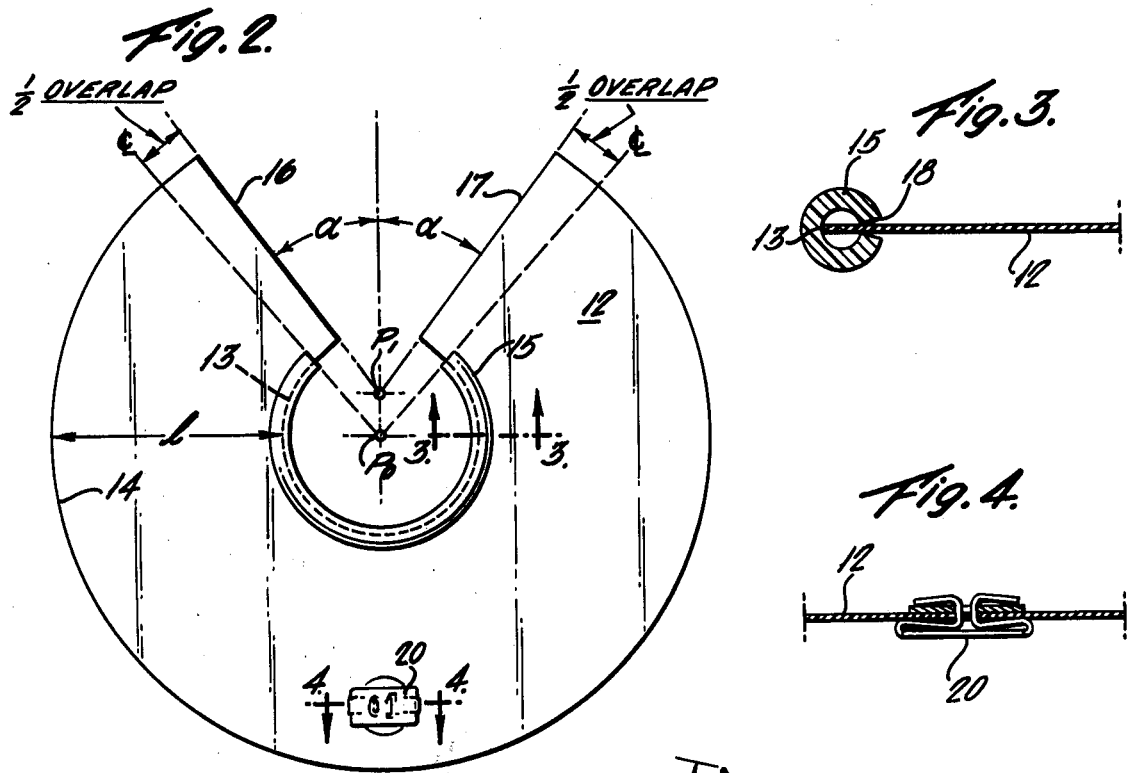
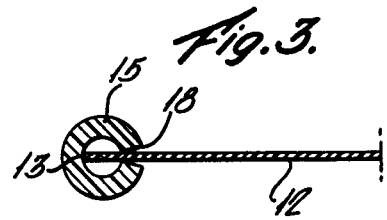
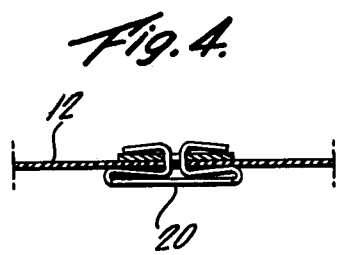
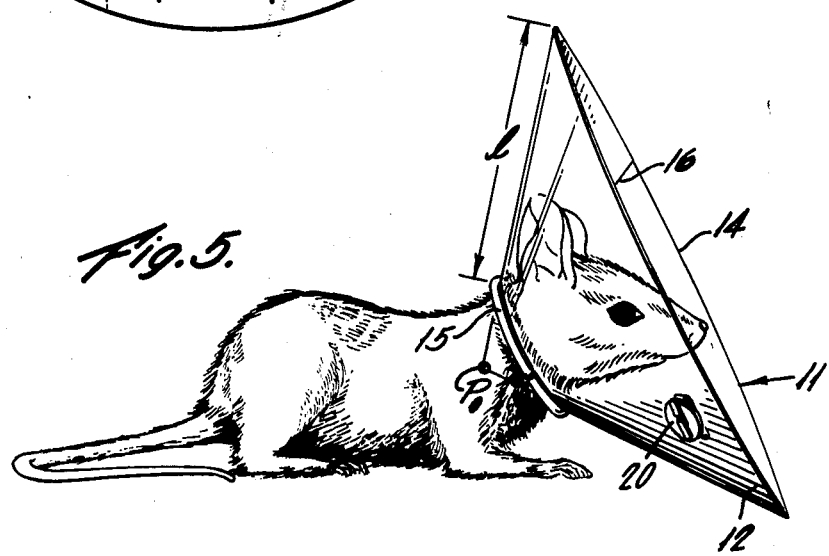

SHIELD FOR TOPICALLY TREATED ANIMALS

BACKGROUND OF THE INVENTION

Testing chemical substances to determine their effect upon man and animals resulting from skin contact has become a wide spread practice not only for determining therapeutic benefits but also for determining toxic effects. It is expected that tests for assessing the effects of dermal application of chemical substance will be carried out with all or nearly all new chemical substances. A variety of tests involving application of test substances to skin surfaces of animals are presently known and undoubtedly others will be developed. In such tests, the accuracy of the results depends upon the ability to maintain the test substances in contact with the skin for extended periods of time. In order to assure that the observed effects are directly attributable to absorption through the skin in the treated area, it is necessary to prevent oral ingestion or removal of the test substance by any other means from the skin surface. In most animals this cannot be achieved without some form of restraint or protective device. It is generally expected that when a test substance in the form of a solution, ointment, salve, or similar formulation is applied, the animal will rub, scratch or lick the area involved resulting in the test substance being lost, ingested or spread over other parts of the animal's body making the subsequently observed results unreliable. Among the test areas utilized in laboratory animals such as mice, rats, guinea pigs and the like, is the area over the back. In some cases the test substances are applied to the back of the ears. Usually, the back of the animal is shaved and the test substance is applied to the shaved area following which observations are made at periodic intervals. Between the application and observation of effect, it is best that the test animal not be able to disturb the test area. Methods to achieve this through the use of protective covers and the like have been previously tried, though none have been completely satisfactory taking into consideration that a suitable method should be inexpensive, easily applied and not interfere with the conduct of the test. One such protective device has been previously disclosed to prevent wounded animals from irritating the wound and interfering with its normal healing. Such a device is disclosed in U.S. Pat. No. 3,036,554 which describes a cone-shaped dog collar extending forward toward the dog's mouth whereby the dog is prevented from biting or licking the wound. The device is, in effect, an alternative to a muzzle. Such prior art devices fail to recognize the need to shield a topically applied test substance. Nor do such devices provide for the easy construction of individually fitted shields with identification for treated test animals. Accordingly, it is an object of this invention to provide an inexpensive, easily fitted, universally applicable shield to protect a topically applied test substance from disturbance by the animal to which the test substance is applied with a minimum of interaction in the animal's normal movements and feeding habits. Another object is to provide a method whereby a test animal can be easily identified by the application of an identifying mark to the protective shield. Still another object is to provide an improved test method for determining safety and efficacy of chemical substances following exposure to the skin. Still other objects will be apparent from the description, drawings and claims which follow.

SUMMARY OF THE INVENTION

This invention pertains to a shield to be attached to a test animal in connection with dermal studies of developmental drugs and other chemical substances whereby the animal is prevented from interfering with the applied test substance by a truncated cone or funnel shaped device of light weight, semi-rigid material, the walls of which have a slant height equal to the distance between the interparietal bones and the edge of the nasal bones of the test animal.

BRIEF DESCRIPTION OF THE DRAWINGS

FIG. 1 is a perspective view of the assembled shield.
FIG. 2 is a plan view of the shield as cut from a flat sheet of material showing the determination of dimensions and configuration required for the desired funnel shaped shield.
FIG. 3 is a partial cross section showing the attachment of the non-chafing collar.
FIG. 4 is a partial cross section showing an identification tag fitted to the shield.
FIG. 5 is a perspective view showing the shield in place on a test animal.

DETAILED DESCRIPTION OF THE EMBODIMENTS

The shield of this invention is preferably made of semi-rigid, elastic material constructed in a funnel-shaped plastic cone with a hole of the appropriate size cut in the center. The shield can be conveniently made of a transparent plastic material such as 0.01" thick circular discs of cellulose acetate, the width of the disc from the circumference of the center hole to the outer edge of the disc is determined by a measurement of the distance from the edge of the interparietal bones to the edge of the nasal bones. Trimming and adjusting of the neck hole can be readily done to fit individual test animals. Suitable tubing can be used to fit a non-chafing collar to the inner edge to prevent irritation and abrasion.

The animals's head is placed through the collar from the convex side and because of the slope of the collar, the animal's ambulatory functions are not significantly impaired. A major advantage is capability of adjustment of the collar over long-term studies by varying the overlap and trimming the collar as needed.

As shown in FIG. 1 there is provided in accordance with this invention a funnel shaped shield 11 composed of a semi-rigid wall 12 with an outer circular edge 14 which is concentric with an inner circular edge 13 protected by a non-chafing ring 15 affixed thereto along the entire circumference of the inner edge. The wall 12 is constructed from a flat sheet cut out as shown in FIG. 2 which is then formed into a funnel shape by drawing together ends 16 and 17 and joining them together preferably by overlapping. The ends 16 and 17 can be joined or fastened to retain the funnel shape by any suitable means. A convenient method is to simply overlap one end over the other and insert fasteners such as staples through both ends in the overlapping area. As shown in FIG. 2 the shield can be readily made by cutting an appropriate size disc from flat stock material such as a plastic sheet material, preferably cellulose acetate. Any of a variety of materials can be used to construct the shield of this invention so long as the material is sufficiently rigid to maintain its funnel-like shape and sufficiently elastic to yield when pawed, etc. without permanent deformation. Preferably, the material will have a smooth shaped surface so efforts to scratch are deflected. Additionally, the shield should be made of a lightweight transparent material.

The shield made in this way can be readily adjusted to fit the necks of various size animals by simply varying the amount by which end 16 overlaps end 17 when drawn together to form a truncated cone or funnel like shield. The size of the inner, generally circular edge 13 which fits about the neck of the animal is determined by the size of the animal's neck. Adjustments are made by varying the amount of overlap when ends 16 and 17 are drawn together. In constructing the shield, the dimension of the inner circle 13 can be easily determined by form-fitting the tubing or similar material to be used in making the non-chafing collar 15 to the animal's neck. The tubing is then cut to length and attached to the inner edge 13 of the shield 11. Preferably, a soft flexible plastic tubing is utilized for such purposes. Illustrative of such tubing is Tygon flexible plastic tubing of the following specifications: I.D. 1/16", O.D. ⅛", wall 1/32". Other materials such as cellulosic materials generally rubber, fabric, or the like can also be used. After fitting the soft flexible tubing around the animal's neck where the shield is to be applied and cutting to size, the tubing is slit lengthwise to form slot 18 and the inner edge of the shield 13 is inserted into the slot 18. When the shield is put in place, the ends of the shield 16 and 17 are drawn together and overlapped until the ends of the non-chafing collar meet whereupon the ends 16 and 17 of the shield are attached together by stapling, riveting or otherwise fastening them with appropriate fastening means 19. The slant height of the shield shown in FIG. 2 as dimension 1 should be cut so as to equal the distance between the interparietal bones and the nasal ridge bones of the animal to which the shield is to be applied. The slant angle of the collar is determined by the angle at Po between the two center lines shown in FIG. 2. Such angle will generally be between 30° and about 90° preferably about 60° and represents about twice the angle shown at $P_1$ as $\alpha$. The lines for ends 16 and 17 are determined by establishing approximately the same angle at a point $P_1$ displaced along the bisecting line. The distance between Po and $P_1$ determines the amount of overlap between ends 16 and 17 and having substantially the same angle of $P_1$ as at Po provides that the overlapping of ends 16 and 17 is about the same amount along the slant height of the cone from the inner edge 13 to the outer edge 14. Generally, the truncated cone formed by drawing ends 16 and 17 together is that of a right angle cone though other shapes e.g. elliptical can also be used.

The shield is also provided with information carrying means 20 such as tags, adhesive tape, etc. applied to the shield and carrying identifying codes and other information such as test parameters. The identifying tag can also be employed as the fastening means to attach ends 16 and 17 of the shield. Preferably, the shield is made of a transparent material to minimize the tendency of the shield to impede or inhibit the animal's normal activities.

In practice, the shield can be generally prepared from materials readily available in most laboratories such as plastic sheet material preferably cellulose acetate although other semi-rigid flexible plastics can also be utilized. Once the non-chafing collar is cut to size, the circumference of the disc to be cut from the flat sheet to form the inner edge 13 of the shield is determined as the length of the collar plus the arc included by the angles $\alpha,\alpha$ and the amount of overlap. In constructing the shield, a disc sized in accordance with the inner circle as described above is cut from the sheet and thereafter, the slant height of the shield is determined by measuring the appropriate dimension of the test animal and laying it off along an extended radius of the inner circle to mark the distance between the inner circle and the outer circle. The outer circumference of the shield is drawn concentric with the inner circle and the shield is cut from the flat sheet material. The portion of the disc between ends 16 and 17 determined as above is removed and the non-chafing collar is then fitted onto the inner edge after which the ends 16 and 17 are drawn together about the animal's neck to bring the center lines into alignment forming a snug fit. The inner edge 13 may be trimmed in the area of overlap as necessary to eliminate any rough edges in the area of the collar. The slant angle of the shield should ordinarily be chosen so as to minimize the distance the shield projects outward from the animal's neck when in place.

If desired, the shield can be pre-cut and assembled with the collar in standard sizes for different species of test animals and trimmed as necessary to adjust for individual variations at the time of application. However, in view of the ease of fabricating the shield and fitting it to test animals, it is preferred to prepare and assemble the shield as part of the test method at the time of applying the test substances and as a part of preparing the animal for application of the test substance. The shield therefore represents a distinct improvement in carrying out dermal tests such as for example skin absorption tests wherein a test substance is applied to the shaved back of the test animal and the effects are observed at periodic intervals following application.

By using the device of this invention, it is possible to achieve accuracy in determining the dermal effect of a drug by assuring that the entire effective dose enters the system by the desired route of administration. By inhibiting the preening activities of the test animal, e.g. a rodent, the device assures that a topically active drug is absorbed only percutaneously rather than by orally ingestion and absorbtion through the gut.

The preferred device is lightweight and adjustable, so as to create a minimum of stress, and to allow the animal to function normally.

I claim:

1. A method for testing the effect of a chemical substance applied to an area of the skin of a laboratory test animal comprising
    (a) fitting a protective shield around the neck of the animal in order to inhibit its preening activity; said protective shield comprising a soft flexible non-chafing collar piece having attached thereto a wall section of flexible sheet material forming a truncated cone extending forward and outward from said collar piece enveloping the head of the animal with the slant height of said truncated cone portion being about equal to the distance between the interparietal bones and the nasal bones of said animal,
    (b) applying the test substance over an area of the back of the animal or an area in the back of the ears of said animal,
    (c) observing the effects of the test substance on the animal at periodic intervals following application of the test substance while maintaining the protective shield in place; and, (d) while the shield is still in place, concluding the test by making a final observation to determine the dermal activity of the test substance unaffected by oral ingestion owing to the presence of the protective shield.

2. The method of claim 1 wherein the test substance is applied to the animal's back.

3. The method of claim 2 wherein the test substance is applied to a shaved area of the animal's back.

4. The method of claim 1 wherein the wall portion of the protective shield is constructed of a flexible transparent plastic material and the collar piece is constructed of soft plastic tubing.

5. The method of claim 4 wherein the wall section of said shield is made of cellulose acetate.

6. The method of any of claims 1 to 5 wherein the protective shield carries an identification tag with information pertaining to the test.

7. The method of claim 6 wherein the identification tag also serves as fastening means to maintain the wall section of said shield in a cone shape.

* * * * *